[19] United States Patent
Knox

[11] 4,293,517
[45] Oct. 6, 1981

[54] DIE WITH INSERT AND ITS USE

[75] Inventor: Kenneth L. Knox, Circleville, Ohio

[73] Assignee: E. I. Du Pont de Nemours and Company, Wilmington, Del.

[21] Appl. No.: 139,796

[22] Filed: Apr. 14, 1980

[51] Int. Cl.³ .............................................. B29F 3/04
[52] U.S. Cl. ........................... 264/176 R; 264/177 R; 264/216; 425/376 A; 425/381; 425/461; 425/466; 425/467
[58] Field of Search ............... 264/177 R, 176 R, 216, 264/40.7, 212, 214; 425/466, 381, 141, 376 R, 376 A, 461, 467, 465

[56] References Cited

U.S. PATENT DOCUMENTS

| | | | |
|---|---|---|---|
| 2,053,920 | 9/1936 | Schade et al. | 264/40.7 |
| 2,387,718 | 10/1945 | Coleman | 425/376 R |
| 2,712,155 | 7/1955 | Nelson | 425/466 |
| 2,821,746 | 2/1958 | Bicher, Jr. | 425/381 |
| 2,923,971 | 2/1960 | Nelson | 425/466 |
| 2,938,231 | 5/1960 | Lowey, Jr. | 425/143 |
| 2,982,995 | 5/1961 | Groleau | 425/466 |
| 2,998,624 | 9/1961 | Ricketts | 425/466 |
| 3,018,515 | 1/1962 | Sneddon | 425/466 |
| 3,039,143 | 6/1962 | Nicholson | 425/466 |
| 3,107,191 | 10/1963 | Brownold | 156/244 |
| 3,187,390 | 6/1965 | Fränkel et al. | 425/141 |
| 3,273,202 | 9/1966 | Zygan | 264/177 R |
| 3,680,997 | 8/1972 | Dukert et al. | 425/381 |
| 3,694,132 | 9/1972 | Bunte et al. | 425/466 |
| 3,706,518 | 12/1972 | Bunte et al. | 425/381 |
| 3,711,235 | 1/1973 | Bunte et al. | 425/466 |
| 3,759,653 | 9/1973 | Schreiber | 425/461 |
| 3,819,775 | 6/1974 | Mules | 425/141 |
| 3,829,274 | 8/1974 | Melead | 425/466 |

Primary Examiner—Jeffery R. Thurlow

[57] ABSTRACT

A die and a process are provided for extruding thermoplastic film with a controlled bead thickness. The die includes inserts at the ends of the die to alter flow of molten thermoplastic material.

9 Claims, 5 Drawing Figures

FIG. 2
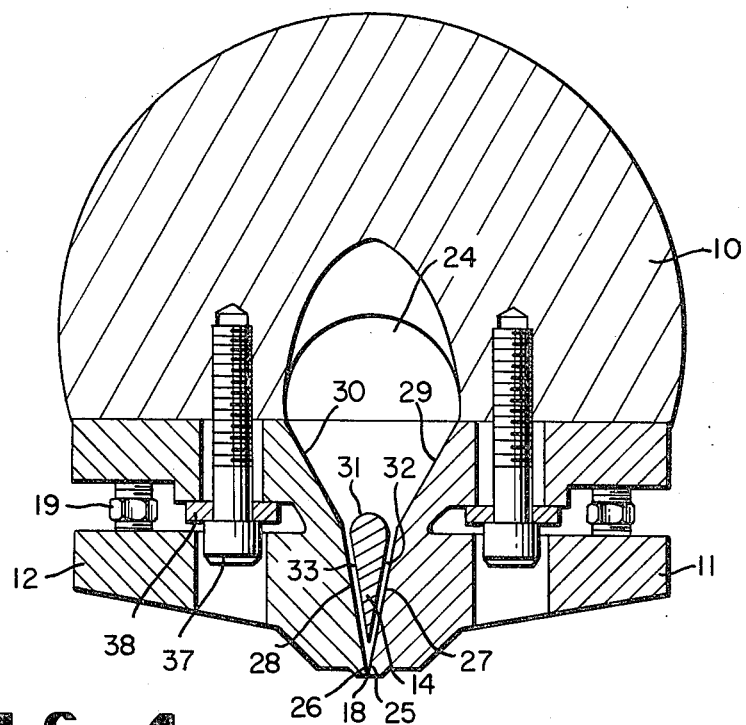
FIG. 4
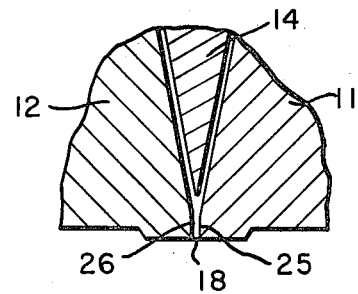
FIG. 3
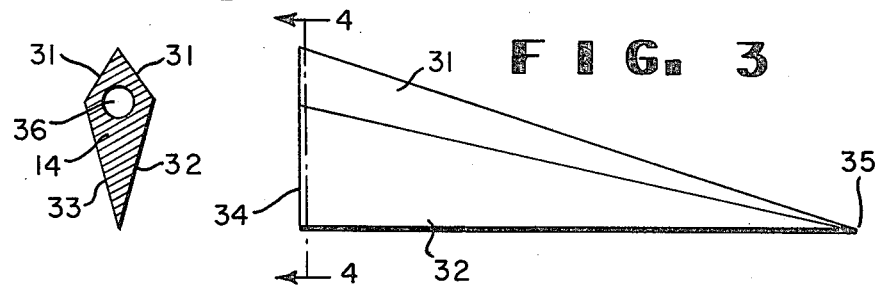
FIG. 5

DIE WITH INSERT AND ITS USE

BACKGROUND OF THE INVENTION

This invention relates to an extrusion die employed in the manufacture of webs of thermoplastic polymeric materials and to manufacture of such webs using that extrusion die.

In the commercial manufacture of extruded thermoplastic webs, one serious deficiency in product quality has been nonuniform and excessively thickened edges. Webs will, hereinafter, be called "films" and will be considered to include films, sheets, ribbons, and any thin, shaped, article of indefinite length and large lateral extension. Extrusion of films is accomplished by forcing molten thermoplastic material through an orifice or die slit which has lips spaced apart to make a film of the desired thickness. The spacing of the lips is at least equal to, and sometimes as much as ten times or more, the desired film thickness. The molten extrudate is generally deposited on a chilled, moving, surface where it is frozen into film form.

From the die lips to the chilled surface, the edges of the extrudate thicken due to various forces including the surface tension of the molten material and the speed of the chilled, moving surface relative to the extrusion velocity of material being extruded. The thickened material is known as a "bead" and, in further processing, the bead edge must be trimmed off and discarded. The bead, thus, represents wasted material unless recycled and, in any event, represents a reduction in yield. While some bead thickening may be desirable to facilitate handling of the film, in uncontrolled film extrusion processes the beads may be as much as 2 to 20 times as thick as the unthickened film and thickening over about 1.5 times is generally taken to be undesirable.

The die of this invention is useful for extruding films of a wide variety of thermoplastic materials including polyolefins such as, polyethylene and polypropylene, polyesters such as polyethylene terephthalate and polybutylene terephthalate, vinyl polymers such as polyvinyl chloride, and the like. It has been found to be especially useful in the manufacture of films of polyethylene terephthalate.

In U.S. Pat. No. 3,107,191, the extruded film width and bead thickness are controlled by means of inserts located between the die lip surfaces at the ends of the die and shaped such that the inward edges of the inserts diverge slightly approaching the exit of the slit. The patent discloses that this divergence of the inserts causes the film edges to be of the same thickness as interior portions of the film. The thickness of film which can be manufactured by the means of this device cannot be adjusted except by changing to inserts of adjusted thickness.

In U.S. Pat. No. 3,829,274 the width of extruded film is adjusted by means of so-called deckle bars which are placed in the die outlet, where die lip surfaces are parallel, to completely block the flow of molten material. The use of two or more deckles in each molten flow stream is disclosed to permit adjustment of edge bead thickness by adjustment of the relative locations of the deckles. Adjustment of the die outlet slit, and, therefore, film product thickness, is limited by the fact that the edge-starving deckles are bars of small diameter and must remain in contact with both die lip surfaces along the complete length of the deckle.

U.S. Pat. Nos. 3,694,132; 3,706,518; and 3,711,235 all disclose the use of external deckle plates and internal deckle rods as an aid to adjusting the width and edge bead thickness of extruded film. The deckle rods are disclosed to have a variety of configurations but all must be in constant sealing contact with each die lip surface in the die outlet.

U.S. Pat. No. 2,982,995 also discloses use of deckle rods to reduce edge bead thickness. That patent discloses deckle rods which are fitted into holes drilled in the die body along the path of extrusion and which deckle rods have inward-projecting ends which have been cut in a flat slant. The flat slant, it is disclosed, permits some control of molten flow by virtue of the variable amount of interference to flow realized by twisting the deckle in its hole.

It has been found that any internal die configuration which causes "dead space" where molten material can stagnate will cause degradation of the material so stagnated. Thus, a die configuration with sharp discontinuities, such as steps on which deckles rest or cylindrical cavities into which deckle rods fit or crevices between deckle rods and inner walls of the die body, is a die configuration which results in some degree of material degradation. The situation is aggravated in dies with deckles extending inward from the die end for any substantial distance.

In addition, it has been found that restrictions in flow which cause a turbulence result in striations in the extruded film product. Thus, barrier or deckle configurations which are irregular or unstreamlined result in continuous marking along the edge of the extruded film.

SUMMARY OF THE INVENTION

According to this invention there is provided a widely adjustable extrusion die with: controlled flow at the ends of the die to maintain controlled edge bead thickness; smooth inner surfaces to prevent degradation of material; and streamlined barriers to prevent turbulence in the flow of extruded material. There is also provided a process for using the extrusion die.

The die of this invention comprises a die structure having an internal chamber with at least one molten thermoplastic inlet and a molten thermoplastic outlet of parallel, spaced-apart, die lands extending along the length of the die structure to form an outlet slit. The internal chamber has two opposing inner walls of substantially flat surfaces, each with one edge parallel with the die lands and diverging away from the die lands at an acute angle with respect to the plane of the die land surfaces.

The die also comprises an insert for at least one end of the die, located in, and extending into, the internal chamber, between the inner walls from the end of the die to the end of the insert. The insert has (i) a downstream edge directed toward the outlet slit and formed as a result of the intersection of two downstream surfaces, (ii) diminishing downstream surfaces from the end of the die to a point at the end of the insert, and (iii) a spaced-apart relationship with the inner walls such that the downstream surfaces are spaced apart from the neighboring inner walls substantially the same distance.

During use of the die, a continuous flow of thermoplastic material is established through the die; and due to the elements of the die, the flow is laminar. To reduce the edge bead thickness of the film, a portion of the thermoplastic material is diverted from the ends of the die structure by the inserts.

DESCRIPTION OF THE DRAWINGS

The invention will be more fully described with reference to the accompanying drawings in which

FIG. 2 is a sectional view of the die taken at line 2—2 of FIG. 1.

FIG. 3 is a plane side view of another insert of this invention and

FIG. 4 is a sectional view of the insert taken at line 4—4 of FIG. 3.

FIG. 5 is an enlarged view of the die lips and insert of FIG. 2.

DESCRIPTION OF THE PREFERRED EMBODIMENTS

Figure 1:
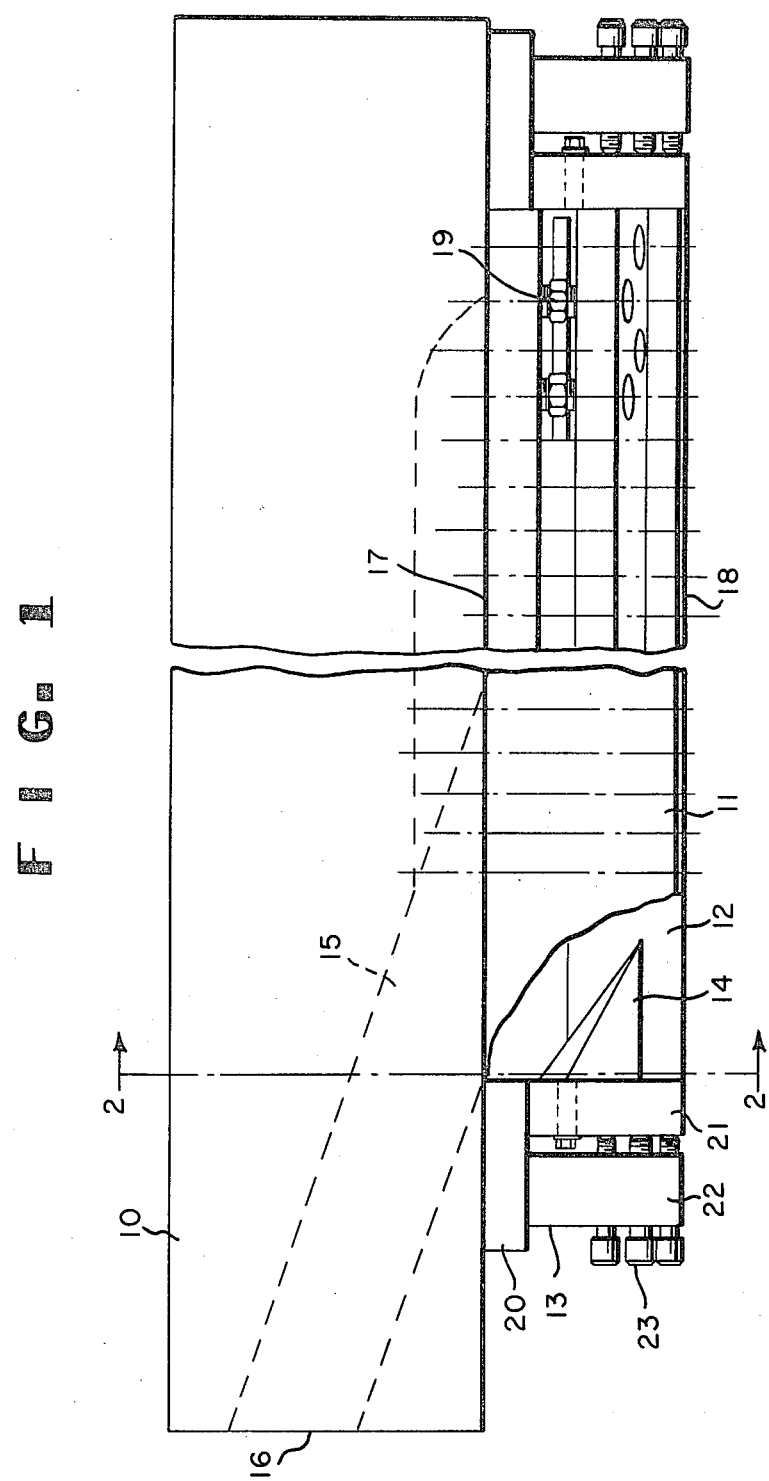
FIG. 1 is a plane side view, partially cutaway, of an extrusion die in accordance with the present invention.

In FIG. 1, the extrusion die is shown to comprise die body 10, die lips 11 and 12, end block 13, and insert 14. The essential die structure includes die body 10 and die lips 11 and 12. Die body 10 is a generally solid, single, piece of material having a cavity 15 (shown by phantom lines) for conduct of molten thermoplastic from inlet 16 to die body distributor face 17. Die lips 11 and 12 are affixed to die body 10 to provide for conduct of molten thermoplastic from cavity 15, between die lips 11 and 12, to outlet slit 18. The inner die volume, made up of cavity 15 and space between die lips 11 and 12, is known as the internal chamber 24 of the die, shown in FIG. 2. The width of outlet slit 18 is controlled and adjusted by means of differential adjusting bolts 19, explained in description of FIG. 2. End block 13 has a base section 20 affixed to die body 10, lip sealing plate 21 positioned against the end of die lips 11 and 12, and support section 22 affixed to base section 20 and carrying sealing bolts 23. Sealing bolts 23 are threaded into support section 22 and rest against lip sealing plate 21. The end of internal chamber 24 is sealed by turning sealing bolts 23 to urge lip sealing plate 21 against the ends of die lips 11 and 12. Insert 14 is generally affixed to lip sealing plate 21 by bolt means.

In FIG. 2, the die structure, of die body 10 and die lips 11 and 12, is shown, in section, from the line 2—2 in FIG. 1. Insert 14 is shown, in sections, located within internal chamber 24. Die lips 11 and 12 are individually affixed to die body 10 by bolts 37 with washers 38. The width of outlet slit 18 is adjusted by turning differential adjusting bolts 19. To lengthen the exposed portion of differential adjusting bolts 19, is to narrow the width of outlet slit 18. Boundaries of internal chamber 24 include the surface of cavity 15 and the inner surfaces of die lips 11 and 12. The inner surfaces of die lips 11 and 12 include die lands 25 and 26, inner walls 27 and 28, and sloping walls 29 and 30. Die lands 25 and 26 are flat, parallel, surfaces extending along the length of the die structure and spaced apart substantially the same distance over that entire length. Inner walls 27 and 28 are in opposing relation to each other, are each substantially flat, each have one edge parallel with one edge of an associated die land, and diverge away from the plane of the die lands at equal acute angles. The acute angles are generally, but not necessarily, equal and range from about 5 to 20 degrees—most usually about 10 to 15 degrees. When the angles are unequal, one of them can be 0 degrees. Sloping walls 29 and 30 have no special or critical shape and serve merely to join inner walls 27 and 28 with cavity 15 to complete internal chamber 24. Insert 14 has upstream surface 31 and downstream surfaces 32 and 33. The angle between downstream surfaces 32 and 33 is twice the angle between the inner walls and the plane of the associated die lands. The insert is streamlined in the direction of downstream surfaces 32 and 33. Downstream surfaces 32 and 33 are spaced near to, and substantially equidistantly apart from, inner walls 27 and 28, respectively. By "substantially equidistantly apart" is meant that, at any point along the length of the insert, both of the downstream surfaces of the insert are substantially the same distance from their neighboring inner walls. The space between the inserts and the inner walls is generally from about 0.1 to 1.0 centimeters and most usually about 0.25 to 0.50 centimeters. The space between the inserts and the neighboring inner walls is generally 0.5 to 4.0 and most usually 0.75 to 2.5 times the width of the outlet slit. The relative position between downstream surfaces 32 and 33 of insert 14 and inner walls 27 and 28 can be adjusted by moving die lips 11 and 12 and by moving insert 14.

FIG. 3 depicts an insert of this invention with a downstream surface 32 and the upstream surface 31. The insert extends from base 34 to point 35. The insert is mounted at the end of the die, such as by being bolted to the lip sealing plate in FIG. 1, at base 34; and point 35 extends into the internal chamber, between the inner walls, located, as previously mentioned, substantially equidistant from the inner walls. While the length of the insert is somewhat dependent upon the kind of thermoplastic material being extruded and upon the thickness of the film being made, inserts are generally 1 to 25 centimeters and most usually 5 to 15 centimeters long. The downstream surfaces are regularly diminished from the base at the end of the die to the point at the end of the insert, as can be seen by downstream surface 33. While the downstream surfaces must be located substantially equidistantly apart from the inner walls, the thickness of the insert can be altered from base to point such that the downstream surfaces are curved and are located nearer to or farther from the neighboring inner walls at the base of the insert than they are farther along the insert. The downstream surfaces are usually straight and it is usually the case that they are located the same distance from the neighboring inner walls at the end of the die as they are at the point at the end of the insert. Upstream surface 31 need have no special or critical shape except that it should have a shape which will not cause excessive hold-up of flowing molten thermoplastic material. In most cases, upstream surface 31 will be rounded in a regular way or will be peaked, as shown in FIG. 4.

In FIG. 4, a section of insert 14 is shown with downstream surfaces 32 and 33 and upstream surface 31. Hole 36 is threaded to provide bolt means to secure insert 14 onto the lip sealing plate and in the die.

In FIG. 5, sections of die lips 11 and 12 and insert 14 from FIG. 2 are shown, greatly enlarged. Die lands 25 and 26 are shown to be parallel and spaced apart to yield outlet slit 18. The plane of each die land forms the boundary of the outlet slit. The width of die lands, that is the distance from the outside edge of the outlet slit to the edge of the inner wall, is generally 0.5 to 5 centimeters and most usually 1 to 3 centimeters.

In operation, molten thermoplastic material is forced into cavity 15 of the extrusion die at inlet 16 and the material is flowed continuously past distributor face 17 and between die lips 11 and 12. The material is formed into a stream with laminar flow between die lips 11 and 12. The material at the ends of the stream is separated by, and passed around, streamlined insert 14 and, by virtue of the diminished surface area from the base of the insert 34 to its point 35, a portion of the material is diverted toward the center. The separated streams are rejoined beyond the insert at the downstream edge, perpendicular with the direction flow, formed by the intersection of downstream surfaces 32 and 33.

What is claimed is:

1. An extrusion die comprising:
    (a) a die structure having an internal chamber with at least one inlet and an outlet of parallel, spaced-apart, die lands extending along the length of the die structure to form an outlet slit;
    the internal chamber having two opposing inner walls of substantially flat surfaces, each with one edge parallel with the die lands and diverging away from the die lands at an acute angle with respect to the plane of the die land surfaces; and
    (b) an insert for at least one end of the die, located in, and extending into, the internal chamber, between the inner walls from the end of the die to the end of the insert;
    the insert, (i) having a downstream edge directed toward the outlet slit and formed as a result of the intersection of two downstream surfaces, (ii) having diminishing downstream surfaces from the end of the die to a point at the end of the insert, and (iii) having a spaced-apart relationship with the inner walls such that the downstream surfaces are spaced apart from the neighboring inner walls substantially the same distance.

2. The extrusion die of claim 1 wherein the downstream surfaces are parallel with the neighboring inner walls.

3. The extrusion die of claim 1 wherein the opposing inner walls diverge away from the die lands at equal acute angles with respect to the plane of the die land surfaces.

4. The extrusion die of claim 1 wherein the thickness of the insert is diminished from the end of the die to the point at the end of the insert such that the downstream surfaces are straight and are located the same distance from the neighboring inner walls at the end of the die as they are at the point at the end of the insert.

5. The extrusion die of claim 1 wherein the acute angles are 10 to 15 degrees.

6. The extrusion die of claim 1 wherein the insert extends into the internal chamber from 1 to 25 centimeters.

7. The extrusion die of claim 1 wherein the space between the insert and the neighboring inner wall is 0.5 to 4.0 times the width of the outlet slit.

8. A process for making a film of thermoplastic material by establishing continuous flow of molten thermoplastic material through a die structure having an internal chamber with an inlet and an outlet of parallel, spaced-apart, die lands extending along the length of the die structure to form an outlet slit wherein the improvement comprises:
    (a) maintaining laminar flow of the thermoplastic material near to the outlet by
    passing the thermoplastic material through an internal chamber with opposing inner walls of substantially flat surfaces, each with one edge parallel with the die lands and diverging away from the die lands at an acute angle with respect to the plane of the die land surfaces and
    (b) diverting a portion of the thermoplastic material from at least one end of the die structure while maintaining laminar flow of the thermoplastic material by
    passing the thermoplastic material, at at least one end of the die structure, around an insert located in, and extending into the internal chamber, between the inner walls from the end of the die to the end of the insert wherein the insert (i) has a downstream edge directed toward the outlet slit and formed as a result of the intersections of two downstream surfaces, (ii) has downstream surfaces diminishing from the end of the die to a point at the end of the insert, and (iii) has a spaced-apart relationship with the inner walls such that the downstream surfaces are spaced apart from the neighboring inner walls substantially the same distance.

9. A process for making a film of thermoplastic material having indefinite length, large lateral extension, substantially constant center thickness, and edges with thickened beads by forming a molten stream of thermoplastic material in laminar flow and conducting it to a chilled surface
    wherein the improvement comprises, in forming the molten thermoplastic material before conducting it to the chilled surface;
    separating the stream of molten thermoplastic material, at the edges, by means of a streamlined insert having diminished surface area from the edge of a point at the end of the insert to divert a portion of the material toward the center and pass the remainder of the material in separated streams;
    conducting the separated streams toward each other at substantially equal acute angles with the direction of flow; and
    rejoining the separated streams immediately beyond the insert in a line perpendicular to the direction of flow.

* * * * *